Patented May 27, 1952

2,598,425

UNITED STATES PATENT OFFICE 2,598,425

PRODUCTION OF CYCLOPENTADIENE-RESINOUS MATERIAL REACTION PRODUCTS

Carl F. Peters, Chicago, Ill., assignor to Velsicol Corporation, Chicago, Ill., a corporation of Illinois No Drawing. Application November 1, 1946, Serial No. 707,329

15 Claims. (Cl. 260—97)

This invention relates to new and useful resinous compositions of matter, and to methods of producing them.

More particularly, the invention relates to the polymeric resinous products which may be prepared by the thermal, non-catalytic reaction between cyclopentadiene and resinous materials, such as rosin, abietic acid, polymerized rosin or rosin esters.

A principal object of the invention is to provide a new and useful type of surface coating material having particular utility in the paint and varnish field.

Another object of the invention is to provide new polymeric, resinous compositions of matter which are soluble in hydrocarbon solvents as well as in esters and high boiling ketones, such solutions being particularly useful as surface coating compositions.

Another object of the invention is to provide resinous compositions of matter which are soluble in drying and semi-drying oils, such solutions being characterized by their pale color, rapidity of drying in air, high gloss, and low staining power.

Another object of the invention is to modify the resinous products derived from the thermal polymerization of cyclopentadiene to increase their solubility in bodied drying oils.

Another object of the invention is to provide a modified rosin which has an acid number considerably lower than that of the usual grades of rosin and which may be used either directly as a resin or reacted with polyhydric alcohols to produce modified "ester gums" or other esterified products of rosin.

Another object of the invention is to provide new and useful resinous products which may be prepared readily and economically from relatively inexpensive raw materials.

These and other objects of my invention, and the manner and methods by which they are accomplished, will become apparent on further consideration of this specification.

It is known that cyclopentadiene, when heated with or without solvents in the range of 75–390° F., polymerizes to form white, crystalline compounds which consist of mixtures of the dimer, trimer, etc. of cyclopentadiene, the hexamer being the largest molecule of such type which has been previously reported. These materials result from a Diels-Alder type addition, the polymerization proceeding via a 1,2:1,4 addition. These polymers are of a relatively low molecular weight, and when greater than the pentamer are insoluble in drying oils and non-aromatic solvents. It is also known that cyclopentadiene polymerizes to form high molecular weight resins when treated with small percentages of catalysts, such as anhydrous halides of aluminum, iron, tin, and zinc, and boron trifluoride. The resulting products, however, are amber to dark red in color, have marked staining characteristics, are essentially insoluble in drying oils, and produce films which become progressively brittle as aging takes place.

I have discovered that it is possible to induce thermally a reaction between cyclopentadiene and abietic acid, rosin, polymerized rosin or rosin esters, such as the product known as Abalyn (the methyl ester of rosin or abietic acid). The reaction results in the formation of new resinous products which are pale in color, and which are soluble in the usual paint and varnish solvents and thinners and in drying oils. By employing reaction temperatures in excess of 400° F. together with appropriate reaction times and concentrations of the reactants, the production of the aforementioned undesirable Diels-Alder polymers is avoided and the polymerization and copolymerization proceed via the normal olefinic type polymerization, resulting in desirable resinous reaction products whose molecular weights, color, melting point, acid number, and solubility characteristics depend upon the time and temperature at which the reaction is carried out, and also upon the concentration of reactants, and solvents employed, if any.

I have also found that the thermally induced reaction between cyclopentadiene and rosin or abietic acid is also accompanied by an appreciable drop in the acid number of the initial reaction mixture, which is probably due to the acylation of unsaturated positions in the thermally produced cyclopentadiene resinous polymers and cyclopentadiene-rosin copolymers. It is known that esters may be formed by the reaction of olefins with acids, these reactions being usually induced by catalysts, such as dilute sulfuric or boron trifluoride. Thus, ethyl acetate is formed by the reaction of ethylene with acetic acid, and cyclohexyl acetate by the reaction of cyclohexene with acetic acid, both reactions being catalyzed by dilute sulfuric acid. These reactions also occur in the absence of catalysts at considerably higher temperatures, but the yield of esters is lower, and more by-products are formed. This type of reaction, then, proceeds under the conditions herein disclosed, and the polymeric products produced have acid numbers appreciably lower than that of the initial reaction mixture. Depending upon the amount of rosin used, as high as 90 per cent of the rosin will undergo esterification. It is obvious, of course, that high percentages of rosin will give products having higher acid numbers than when small percentages are employed. The acid number of the product will also be influenced by the time and temperature of reaction, given any concentration of rosin in cyclopentadiene.

In preparing the resinous products herein described I prefer to use a fairly good grade of cyclopentadiene (95 to 100% pure), or a similar grade of dicyclopentadiene, or the $C_5H_6$ cyclic diene Diels-Alder polymers of cyclopentadiene (as for sample, the trimer, tetramer or pentamer) which presumably break down to, and react as monomer in the process of my invention. My invention is not limited, however, to such grades of purity for the hydrocarbon reactants; and hydrocarbon fractions consisting essentially of, or rich in, cyclopentadiene or the $C_5H_6$ cyclic diene Diels-Alder polymers thereof, such as special cuts of "crude solvent naphtha," by products obtained by the cracking of gaseous hydrocarbon mixtures (e. g. dicyclopentadiene concentrate and "Dripolene"), etc., may also be used as sources of cyclopentadiene in the reaction.

Commercial rosin consists essentially of a mixture of isomeric forms of abietic acid. In preparing the resinous products of my invention I have used successfully various grades and types of both gum and wood rosin, such as those known in the trade as "Solros," "WW Rosin," "Tenex," etc. Polymerized rosin, which may be prepared by suitable known treatment, such as acid treatment, or other appropriate methods, may be employed. Rosin esters may also be utilized. Among these rosin esters may be mentioned for example, "ester gums," prepared by esterifying rosin with glycerol; "Pentalyn," the trade name of a product manufactured by Hercules Powder Company, and which is prepared by esterifying rosin with pentaerythritol; the esterified product of rosin with diethylene glycol; and "Abalyn," a commercial methyl abietate produced by Hercules Powder Company.

In preparing the resinous products which are the subject of this invention I prefer to use reaction temperatures essentially above 400° F., and usually between 400 and 650° F., although even higher temperatures may be employed in some cases. The reaction is carried out in the liquid phase, and therefore adequate superatmospheric pressure is employed correlative to the reaction temperature. This elevated pressure will range from about 25 to 50 pounds per square inch for the lower temperature indicated, up to 300 pounds or more at the higher reaction temperatures. The reaction may be carried out in the presence or absence of air, and solvents for the reactants, but inert with respect thereto, may or may not be utilized. The time and temperature of reaction involved are dependent upon the type of resinous product desired, that is, upon such factors as (1) the amount of solvent used, if any, (2) the percentage of rosin in the reaction mixture, (3) the acid number of the rosin used, (4) the acid number desired in the product, (5) the melting point and color desired in the product, and (6) the desired solubility characteristics of the reaction product. In general high reaction temperatures and/or prolonged reaction periods result in products which have relatively higher melting point, color, molecular weight, and percentage of acylation, and lower order of solubility in bodied drying oils, than products which are formed at lower reaction temperatures and shorter reaction periods. This will be brought out by an examination of the examples recited herein. The reactions may be carried out in sealed pressure vessels, the latter being heated externally by a liquid which is maintained at the appropriate temperature. The reactants may also be circulated through a reaction zone which is a tube heated externally by a heat exchange medium, the mixture being circulated until a product having the desired properties is obtained. These resinous reaction products may also be formed by employing a continuous type reaction unit, whereby rosin, abietic acid, polymerized rosin, or rosin esters, admixed with cyclopentadiene, its cyclic diene Diels-Alder polymers, or concentrates consisting essentially of, or rich in, these materials, are fed into a heated reaction tube, the temperature of reaction and time in the tube being regulated by the properties desired in the finished resinous product.

In preparing the resinous products which are the subject of this invention, I prefer to react a mixture of cyclopentadiene, or compounds and hydrocarbon mixtures which, when heated, are a source of cyclopentadiene, and rosin or the other above-mentioned rosin materials, by either heating such mixtures in sealed vessels or in a continuous reactor of the type previously mentioned. However, the resinous products of my invention may also be produced by heating cyclopentadiene or its diene Diels-Alder polymers, e. g. dicyclopentadiene, tricyclopentadiene, tetracyclopentadiene, etc., all of which are crystalline and nonresinous, for relatively short periods of time at temperatures between approximately 400 to 550° F., at which temperature the said diene polymers of cyclopentadiene are unstable, thereby forming liquid and solid resinous polyene cyclopentadiene polymers which are highly unsaturated in character (typically with an iodine number 200–225 Wijs method); rosin, polymerized rosin, rosin ester or abietic acid is now added to these polymers, and the mixture is heated at appropriate temperatures (e. g. 400 to 650° F.) until the desired products are obtained. The reaction products resulting from either type of reaction are quite similar, but the time required when the second procedure is used is usually considerably more than when the reactants are mixed previous to the heat treatment of the dienes. Products possessing relatively higher acid numbers are formed when the latter method of reaction is employed, which property is highly useful in certain applications.

The reaction product herein described can be incorporated directly into drying and non-drying oils, such oleoresinous compositions being very pale in color, and the varnish films being characterized by their rapid drying time, high gloss, and excellent resistance to water and aqueous alkali. The resinous products which possess high acid numbers can be used in various applications such as in emulsion waxes, where this property is essential. Furthermore, such resins may be readily reacted with glycerine, pentaerythritol, and other polyhydroxy compounds to form resins which are very useful in oleoresinous coating compositions. Since the acid number of these resinous products is considerably lower than that of rosin, it is obvious that the quantity of glycerine, pentaerythritol, etc. necessary to esterify these resins is considerably less than the amount required to esterify an equal weight of rosin. Furthermore, when these cyclopentadiene-rosin reaction products are subsequently esterified, the resulting resins are much improved over the usual "ester gum" or "pentalyn" type resins, in that their resistance to water, alkali, and acids, and their ability to dry very rapidly are considerably improved.

For purposes of exemplification, but not limitation, I will now describe a number of small-scale preparations utilizing the broad principles of my invention. In all of these examples the cyclopentadiene used is understood to be 95 to 98 per cent pure.

*Example 1*

A mixture of 66 g. of cyclopentadiene and 66 g. of abietic acid is placed in a steel bomb, and the sealed bomb heated at 525° F. for three hours. The product is a hard, clear resin, which has the following properties: M. P. 246° F. (ball and ring); color 2 (Barrett scale); acid number 31; mol. wt. 638 (determined cryoscopically in camphor). The resin is soluble in aromatic and naphtha solvents, and in raw and bodied linseed oil. A 20 gallon length bodied linseed oil varnish, 50 per cent solids in mineral spirits, has an 8 color (Hellige) and E viscosity (Gardner). The drop in acid number of the reaction mixture indicates that 60 per cent of the rosin has acylated the resin.

*Example 2*

A mixture of 99 g. of WW Rosin (acid number 160), 20 g. of cyclopentadiene, and 34 g. of naphtha solvent is placed in a steel bomb in a nitrogen atmosphere, and the sealed bomb is heated at 500° F. for five hours. The resin solution is distilled, in vacuo, to a resin temperature of 500° F. The product is a hard, clear resin, which has the following properties: M. P. 215° F.; color 1½ (Barrett scale); acid number 86.8. A 20 gallon length bodied linseed oil varnish, 50 per cent solids, has an 8 color (Hellige) and E viscosity (Gardner).

*Example 3*

A mixture of 66 g. of WW Rosin, 132 g. of cyclopentadiene, and 22 g. of naphtha solvent is placed in a steel bomb, nitrogen atmosphere, and the sealed bomb is heated at 500° F. for three hours. The resin solution is distilled in vacuo to a resin temperature of 500° F. The product is a hard, clear resin, which has the following properties: M. P. 250° F.; color 1½ (Barrett); acid number 6.9. The drop in acid number of the reaction mixture indicates that 87 per cent of the rosin has acylated the resin. A 20 gallon length bodied linseed oil varnish, 50 per cent solids, has 8-9 color (Hellige) and F viscosity (Gardner).

*Example 4*

A mixture of 66 g. of "Tenex" rosin (acid number 145), manufactured by Newport Industries, and 66 g. of cyclopentadiene is placed in a steel bomb which is sealed and heated at 475° F. for four hours. The product is a hard, very pale yellow, clear resin, which has the following properties: M. P. 175° F.; color 6 (Hellige, 50% soluble in naphtha); acid number 10.7. The drop in acid number of the reaction mixture indicates that 85.4 per cent of the rosin has acylated the resin. A 20 gallon length bodied linseed oil varnish, 50 per cent solids, has 5 color (Hellige) and E viscosity.

*Example 5*

150 g. of cyclopentadiene is heated in a sealed bomb, nitrogen atmosphere, at 500° F. for thirty minutes. To the clear, viscous polymer is added 150 g. of WW Rosin, and the mixture is heated for three hours at 500° F. The product is a hard, clear resin, which has the following properties: M. P. 270° F.; color 10 (Hellige); acid number 42.3. The resin is soluble in aromatic and naphtha solvents, and in drying oils.

*Example 6*

A mixture of 66 g. of cyclopentadiene and 63 g. of "Abalyn," a commercial methyl abietate produced by Hercules Powder Company, is placed in a steel bomb and the sealed bomb is heated at 500° F. for five hours. The product is a clear, pale yellow, soft solid, which has the following properties: M. P. 160° F.; color 9-10 (Hellige); soluble in aromatic and naphtha solvents, and in drying oils.

*Example 7*

100 grams of polymerized resin sold under the trade name "Nuroz" (produced by Newport Industries), which contains about 33 per cent dimerized rosin and has an acid number of 148.4 is dissolved in 200 g. of dicyclopentadiene. This solution is placed in a steel bomb, in a nitrogen atmosphere, and the sealed bomb heated at 510° F. for three hours. The reaction product is a hard, clear resin with the following properties: M. P. 294° F.; color 10 (Hellige). The acid No. 7.1 indicates that 85 per cent of the rosin has been esterified during the reaction. This resin can be cooked into drying oils, and the varnishes form very hard and durable coatings.

*Example 8*

60 g. of "Nuroz" polymerized rosin is dissolved in 135 g. of cyclopentadiene. This solution is heated in a steel bomb at 500° F. for six hours. The reaction product is a hard, clear, brittle resin with the following properties: M. P. 342° F.; color 12 (Hellige). The acid No. 8.3 indicates that 83 per cent of the rosin has been esterified during the reaction. The resin is soluble in aromatic and naphtha solvents, and can be cooked into the common known types of unsaturated triglyceride drying oils.

The preparations described above have been given for purposes of illustration, not limitation. It will be obvious to one skilled in the art that there is considerable permissible latitude in the concentrations and properties of the reactants and in time, temperature and other conditions employed in the reaction. All such modifications of the broad principles of my invention are considered to be comprehended as within its scope, the limitations being defined only by the claims.

I claim as my invention:

1. A process for preparing a new composition of matter which consists in thermally reacting cyclopentadiene and a reactant taken from the group consisting of rosin, abietic acid, polymerized rosin, and rosin esters at a temperature between 400 and 650° F.

2. A process for preparing a new composition of matter which consists in reacting at a temperature between about 400° F. and 650° F. and in the liquid phase a mixture of cyclopentadiene and a reactant taken from the group consisting of rosin, abietic acid, polymerized rosin, and rosin esters.

3. A process for preparing a new composition of matter which consists in reacting at a temperature of about 400° to 650° F. and at a superatmospheric pressure adequate to maintain the reactants in the liquid phase a mixture of from about 1 to 95 parts by weight of cyclopentadiene and from about 99 to 5 parts by weight of a resinous material selected from the group consisting of rosin, abietic acid, polymerized rosin, and rosin esters.

4. A process according to claim 3 in which the cyclopentadiene is partially thermally polymerized before being reacted with the resinous material.

5. A process according to claim 3 in which the cyclopentadiene is utilized in the form of its polymers which are capable of depolymerizing at the temperatures employed in the thermal reaction.

6. A process according to claim 3 in which cyclopentadiene is utilized in the form of dicyclopentadiene.

7. A process according to claim 3 in which the reactants are dissolved in an inert solvent.

8. A process according to claim 3 in which the thermal reaction product is subsequently esterified with a polyhydric alcohol.

9. A process for reducing the acid number of rosin which consists in reacting the rosin thermally with cyclopentadiene at a temperature between 400 and 650° F.

10. A process for preparing a new composition of matter which consists in reacting at a temperature between 400–650° F. and at a superatmospheric pressure adequate to maintain reactants in the liquid phase, a mixture of from about 1–95 parts by weight of cyclopentadiene and from about 99–5 parts by weight of rosin.

11. As a new composition of matter the resinous thermal reaction product consisting of cyclopentadiene and rosin formed at a temperature between 400 and 650° F.

12. As a new composition of matter a liquid coating composition containing the resinous thermal reaction product consisting of cyclopentadiene and rosin formed at a temperature between 400 and 650° F.

13. As a new resinous composition of matter the polyhydric alcohol ester of the resinous thermal reaction product consisting of cyclopentadiene and rosin formed at a temperature between 400 and 650° F.

14. As a new composition of matter a liquid coating composition containing a polyhydric alcohol ester of the resinous thermal reaction product consisting of cyclopentadiene and rosin formed at a temperature between 400 and 650° F.

15. A new resinous composition of matter from the group consisting of the thermal reaction product of cyclopentadiene and rosin formed at a temperature of between 400 and 650° F., and the polyhydric alcohol ester thereof.

CARL F. PETERS.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,361,018 | Gerhart | Oct. 24, 1944 |
| 2,381,969 | Catlow | Aug. 14, 1945 |
| 2,387,895 | Gerhart | Oct. 30, 1945 |
| 2,395,452 | Bruson | Feb. 26, 1946 |
| 2,399,179 | Gerhart | Apr. 30, 1946 |
| 2,443,044 | Lycan et al. | June 8, 1948 |
| 2,468,770 | Morris | May 3, 1949 |
| 2,477,654 | Rummelsberg | Aug. 2, 1949 |